(12) United States Patent
Disbrow

(10) Patent No.: US 9,964,239 B2
(45) Date of Patent: May 8, 2018

(54) EXPANDABLE AIR HOSE AND PROCESS

(71) Applicant: Don Disbrow, Mauldin, SC (US)

(72) Inventor: Don Disbrow, Mauldin, SC (US)

( * ) Notice: Subject to any disclaimer, the term of this patent is extended or adjusted under 35 U.S.C. 154(b) by 0 days. days.

(21) Appl. No.: 15/066,657

(22) Filed: Mar. 10, 2016

(65) Prior Publication Data

US 2016/0195202 A1 Jul. 7, 2016

Related U.S. Application Data

(63) Continuation-in-part of application No. 14/556,525, filed on Dec. 1, 2014.

(60) Provisional application No. 61/910,223, filed on Nov. 29, 2013.

(51) Int. Cl.
*F16L 11/00* (2006.01)
*F16L 11/12* (2006.01)
*F16L 11/20* (2006.01)

(52) U.S. Cl.
CPC ............... *F16L 11/12* (2013.01); *F16L 11/20* (2013.01)

(58) Field of Classification Search
CPC . F16L 11/10; F16L 11/12; F16L 11/20; B29L 2023/005
USPC .................. 138/118, 119, 137; 239/195, 281
See application file for complete search history.

(56) References Cited

U.S. PATENT DOCUMENTS

| | | | |
|---|---|---|---|
| 781,349 A | 1/1905 | Moore | |
| 935,086 A | 9/1909 | Baird | |
| 1,053,933 A | 2/1913 | Stowe | |
| 1,164,303 A | 12/1915 | Nicewarner | |
| 2,329,826 A | 9/1943 | Huthsing | |
| 2,598,002 A | 5/1952 | Smith | |
| 3,021,871 A * | 2/1962 | Rodgers | B29C 53/12 138/118 |
| 3,374,806 A | 3/1968 | Skinner | |
| 3,581,778 A * | 6/1971 | Korejwa | B29C 47/02 138/119 |
| 3,826,288 A * | 7/1974 | Cooper | B65H 75/36 138/118 |
| 4,009,734 A * | 3/1977 | Sullivan | B29C 53/12 138/118 |
| 4,467,837 A | 8/1984 | Baker | |
| 6,523,539 B2 | 2/2003 | McDonald et al. | |
| 6,948,527 B2 * | 9/2005 | Ragner | F16L 11/118 138/118 |
| 6,955,189 B1 | 10/2005 | Weyker | |
| 7,549,448 B2 * | 6/2009 | Ragner | F16L 11/118 138/109 |
| 7,592,544 B2 * | 9/2009 | Carscallen, II | B66F 9/122 138/118 |
| 8,291,941 B1 * | 10/2012 | Berardi | F16L 11/20 138/109 |

(Continued)

*Primary Examiner* — Patrick F Brinson
(74) *Attorney, Agent, or Firm* — John B. Hardaway, III; Nexsen Pruet, LLC

(57) ABSTRACT

A pneumatic air hose is formed from an inner elastic tubular member surrounded by an outer inelastic tubular member. In use, one end of the air hose is connected to an air compressor and the end to a pneumatic tool. When engaged, the pneumatic air hose and inner elastic tubular member expand to an extended state while the outer tubular sleeve is extended along with the inner tubular member to a length greater than the original non-extended state. Upon disengagement of the air compressor, the expandable hose resumes its original non-extended state.

10 Claims, 4 Drawing Sheets

(56) References Cited

U.S. PATENT DOCUMENTS

| | | | |
|---|---|---|---|
| 8,291,942 B2 * | 10/2012 | Berardi | F16L 11/12 |
| | | | 138/118 |
| 8,479,776 B2 | 7/2013 | Berardi | |
| 8,757,213 B2 | 6/2014 | Berardi | |
| D719,244 S | 12/2014 | Yang | |
| 8,936,046 B2 | 1/2015 | Ragner | |
| D723,669 S | 3/2015 | Berardi | |
| 9,022,076 B2 | 5/2015 | Ragner et al. | |
| D731,032 S | 6/2015 | Yang | |
| 9,074,711 B2 | 7/2015 | Huang | |
| 9,127,791 B2 | 9/2015 | Ragner | |
| 2004/0124287 A1 * | 7/2004 | Pianetto | F16L 11/085 |
| | | | 239/588 |
| 2005/0115622 A1 | 6/2005 | Bennett | |
| 2006/0070679 A1 * | 4/2006 | Ragner | F16L 11/118 |
| | | | 138/119 |
| 2012/0234425 A1 * | 9/2012 | Berardi | F16L 11/12 |
| | | | 138/137 |
| 2013/0180615 A1 * | 7/2013 | Ragner | F16L 11/118 |
| | | | 138/119 |

\* cited by examiner

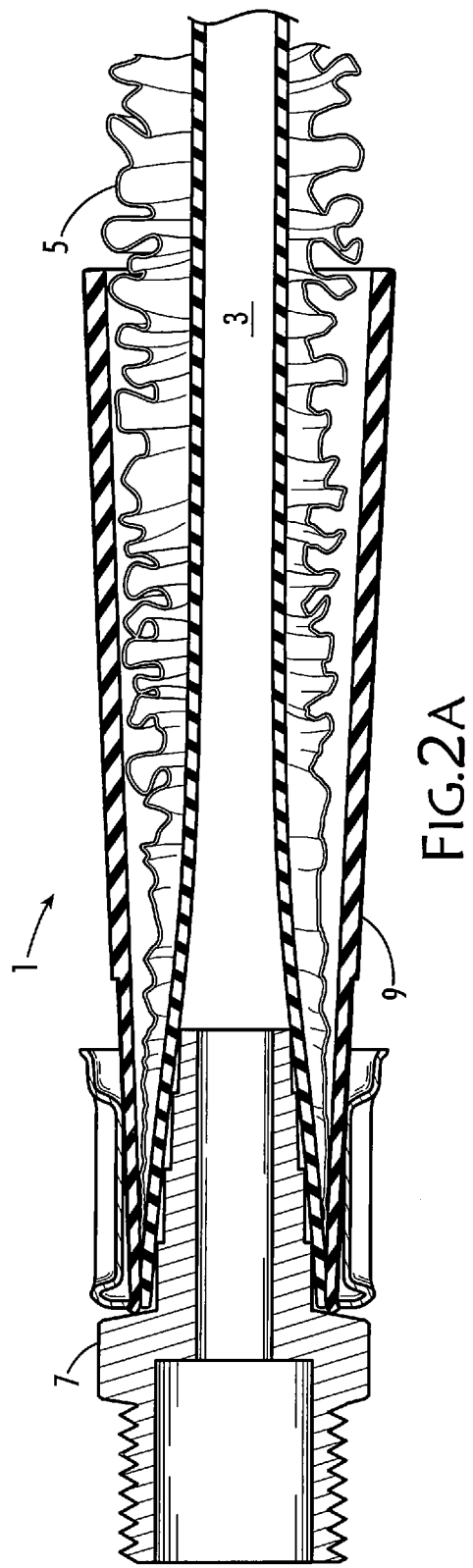
FIG.2A
FIG.2B

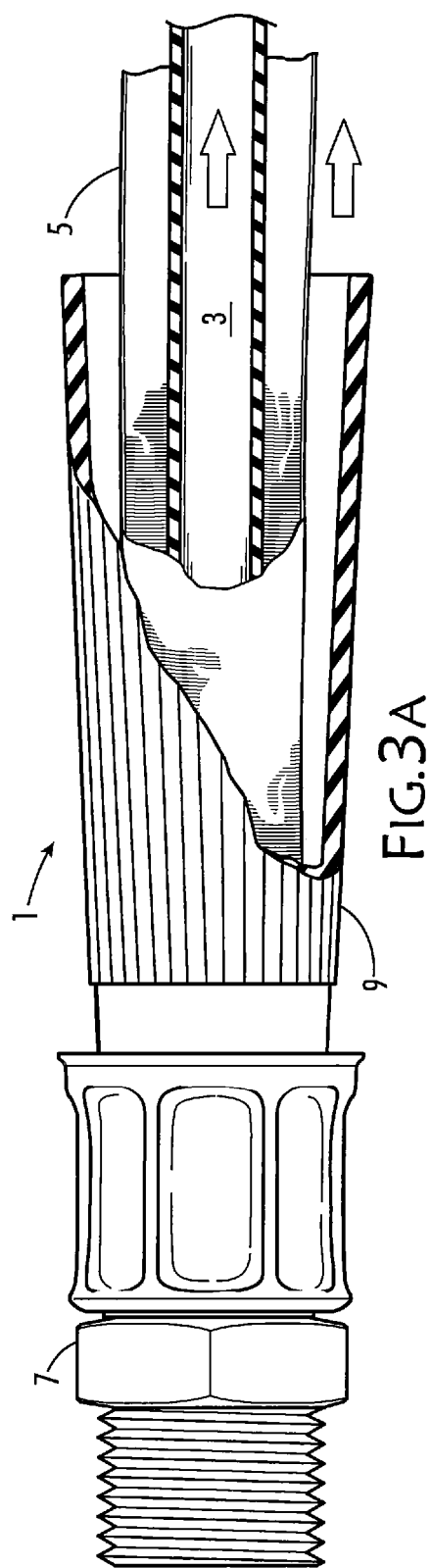
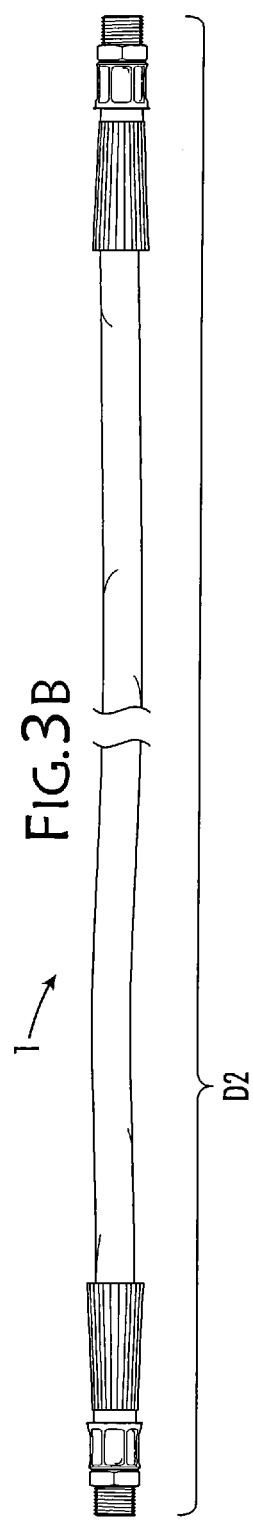
FIG.3A
FIG.3B

EXPANDABLE AIR HOSE AND PROCESS

CROSS REFERENCE TO RELATED APPLICATION

This application is a Continuation in Part of U.S. application Ser. No. 14/556,525 filed Dec. 1, 2014 which claims the benefit of U.S. Provisional Application No. 61/910,223 filed on Nov. 29, 2013. The above identified patent application is herein incorporated by reference in its entirety to provide continuity of disclosure.

BACKGROUND OF THE INVENTION

1. Field of the Invention

The present invention relates to pneumatic air hoses. More specifically, the present invention pertains to an improved air hose that is utilized in conjunction with an air compressor and a variety of pneumatic tools such as blow guns, nail guns, and air staplers.

An air compressor is a device that converts power from a motor or engine into energy to compress air. The compressed air is generally contained within a pressure vessel, and the release of the compressed air can be triggered in quick bursts. Two of the most common uses for an air compressor are inflation and pneumatic tools.

An inflation attachment includes a nozzle that allows one to inflate everything from beach balls to automobile tires. Pneumatic tools are generally faster, lighter and more powerful than traditional power tools. Some pneumatic tools that are useful with an air compressor include: a blown gun, a nail gun, an air stapler, and a spray gun.

An air compressor is usually attached to a pneumatic tool by an elongated air hose. However, these hoses can be bulky and cumbersome to work with. Such elongated hoses can be easily tangled and frustrating to unwind and rewind neatly for each use. A traditional hose also may require significant storage space. Therefore, there exists a need for an improved air hose that is compact and configured for use with air compressors.

2. Description of the Prior Art

Devices have been disclosed in the prior art that relate to hoses. These include devices that have been patented and published in patent application publications. Devices in the art include those that expand longitudinally and laterally upon the application of fluid pressure. Other devices include a hose for fluids having an inner tube member made from elastic material and an outer tube member made from a non-elastic material. These prior art devices, however, do not disclose a hose utilized with an air compressor and having the structure of the present invention. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 8,291,942 to Berardi discloses a hose that expands longitudinally and laterally upon the application of fluid pressure. The Berardi device can expand longitudinally up to six times its contracted length. The Berardi device discloses an inner tube made from elastic material and an outer tube made from non-elastic material. The inner tube is positioned concentrically within the outer tube secured by the first end and second end of both inner and outer tubes.

Similarly, Published U.S. Patent Application Number 2013/0087205 to Berardi discloses a hose having an inner tube member made from elastic material and an outer tube member made from a non-elastic material. The inner tube member is secured to the outer tube at the ends by an inlet coupler and an outlet coupler. The inlet coupler is adapted to secure to a water supply and the outlet coupler is coupled to a flow restrictor allowing the inner tube to equalize in pressure with water received from water supply. Water expands the inner tube longitudinally and laterally.

U.S. Pat. No. 4,895,185 to Champleboux discloses a flexible hose and expandable hose for utilization in fields. The Champleboux device discloses a hose including at least two pairs of adjacent reinforcing layers made of flexible cables disposed helically and attached to at least one rigid end piece. Rigid end piece include an inner supporting element and an outer gripping element. Inner supporting element and outer gripping element are coaxial and having conical compression surfaces, which diverge toward one end. The Champleboux device is a hose for well packers.

Finally, U.S. Pat. No. 6,889,701 to Kovacik discloses a reel for storing an air hose having a spring-loaded pulley system mounted therein. The reel includes a hollow reel housing with a flange mounted thereon exterior of the housing, a pulley rotatably mounted inside the housing. The pulley further includes a nozzle mounted thereon. A reel hose is wound on the pulley with one end attached to the nozzle.

The devices disclosed in the prior art have several known drawbacks. These devices are limited as they are not adapted for use with an air compressor. One invention discloses a hose that expands longitudinally and laterally upon the application of fluid pressure. Another invention discloses a hose for fluids having an inner tube member made from elastic material and an outer tube member made from a non-elastic material.

SUMMARY OF THE INVENTION

It is thus an object of this invention to provide a novel pneumatic air hose.

It is further an object of this invention to provide such a pneumatic air hose which is expandable when in use and which shrinks to a non-expanded state when not in use.

It is a further object of this invention to provide a process of utilizing an expandable pneumatic air hose.

These as well as other objects are achieved by an expandable pneumatic air hose formed from an inner elastic tubular member surrounded by an outer inelastic tubular sleeve. The process is carried out by connecting one end of the elastic tubular member to an air compressor and connecting the other end thereof to a pneumatic tool, engaging the air compressor to expand the inner tubular member to an extended state while the outer tubular sleeve is extended along with the inner tubular member to a length greater than the original non-extended state. Upon disengagement of the air compressor the expandable hose resumes its original non-extended state.

BRIEF DESCRIPTION OF THE DRAWINGS

FIG. 2A is a cross section of an end of the expandable hose in the non-extended state.

FIG. 2B is a plan view of the extendable air hose in the non-extended state having a length D.

FIG. 3A is a cross section of the extendable air hose in the extended state.

FIG. 3B is a plan view of the extendable air hose in the extended state having a length D2.

DETAILED DESCRIPTION OF THE INVENTION

In accordance with this invention, it has been found that a pneumatic air hose may be formed so as to be extendable for use with pneumatic tools while having a non-extended shorter state for storage when not in use. Various other advantages and features will become apparent from the following description.

Figure 1A:
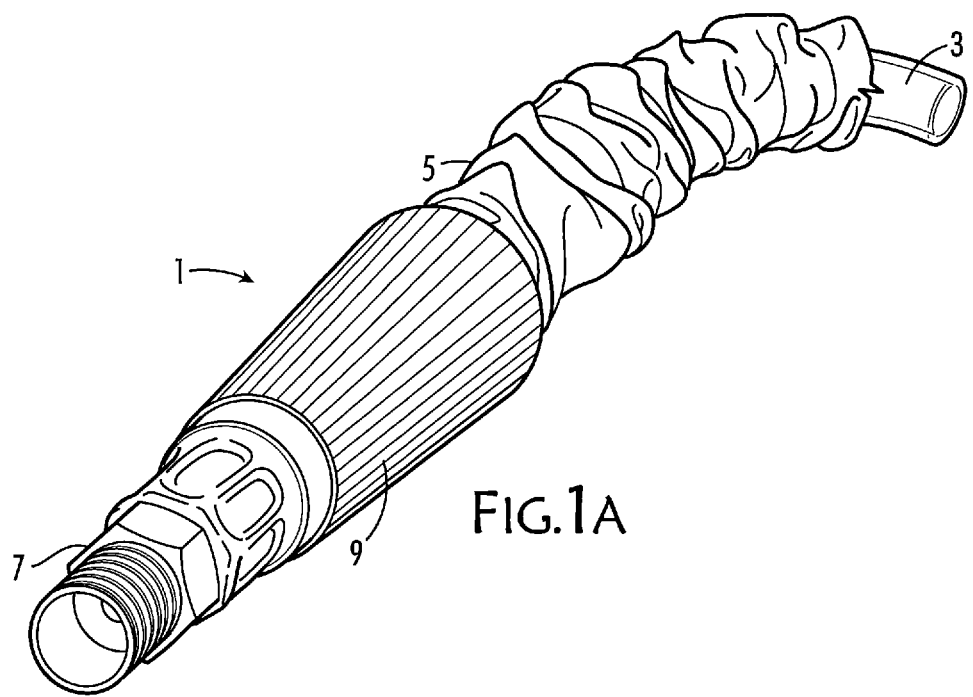
FIG. 1A is a perspective view of the expandable air hose of this invention in the non-extended state.

FIG. 1A is a perspective view in partial cutaway of the extendable hose 1 in accordance with this invention. The extendable hose has an inner tubular elastic member 3 surrounded by a tubular inelastic sleeve 5. Inner elastic tubular member 3 is connected to pneumatic fitting 7 which can be connected to a pneumatic tool or air compressor in the conventional mode. A handle 9 facilitates attachment. The expandable air hose 1 when inflated extends to approximately one and one-half to two times its non-extended state. When extended the outer non-elastic tubular sleeve 5 is extended along with the elastic tubular member 3. Inelastic sleeve 5 is capable of extending to the greater length due to a very loose ruffling about the elastic tubular member 3.

Figure 1B:
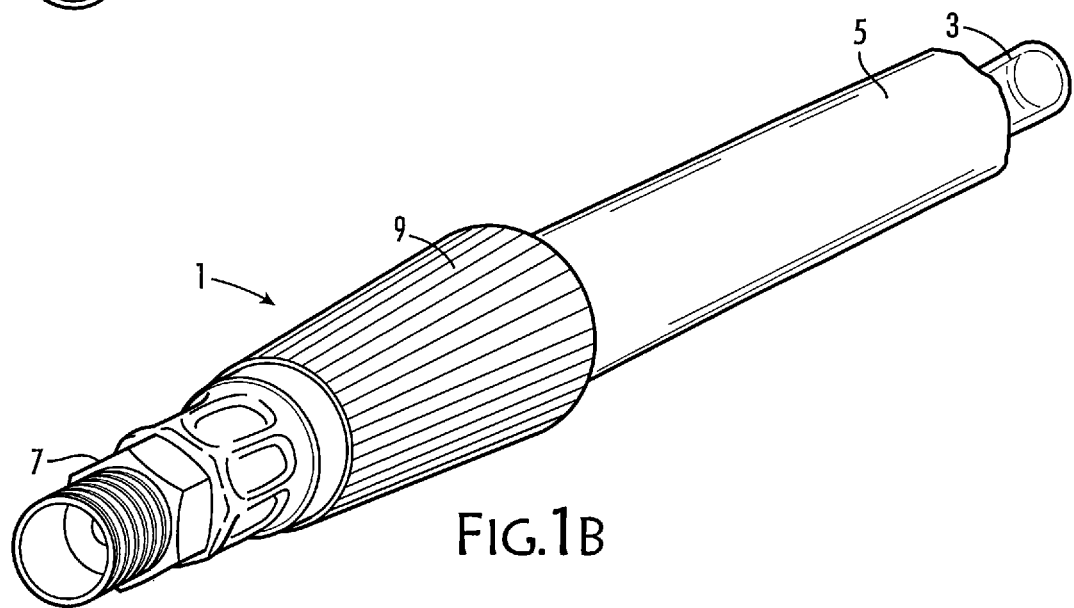
FIG. 1B is a perspective view of a portion of the extendable air hose in the extended state.

When the expandable hose is inflated in actual use the inelastic outer sleeve 5 is extended to the full extent of the extension of the inner tubular member 3. Such is illustrated in FIG. 1B where the inelastic tubular sleeve has been extended to substantially remove the ruffles therein. This is further illustrated in the cutaway view of FIG. 2A which illustrates the extendable hose 1 in the non-extended state.

FIG. 3A is a partial cutaway view of the extendable hose 1 in the extended state. The arrows in FIG. 3A indicate the direction of expansion when in the extended state.

FIG. 2B is a plan view of the expandable pneumatic hose 1 in the non-extended state having a length D. FIG. 3B is a plan view showing the expandable hose 1 in the extended state having a length D2. In actual operation the ratio D2 to D is within the range of 1.5 to 2. This extension occurs upon application of compressed air at a pressure within the range of 90-120 psi.

Figure 4:
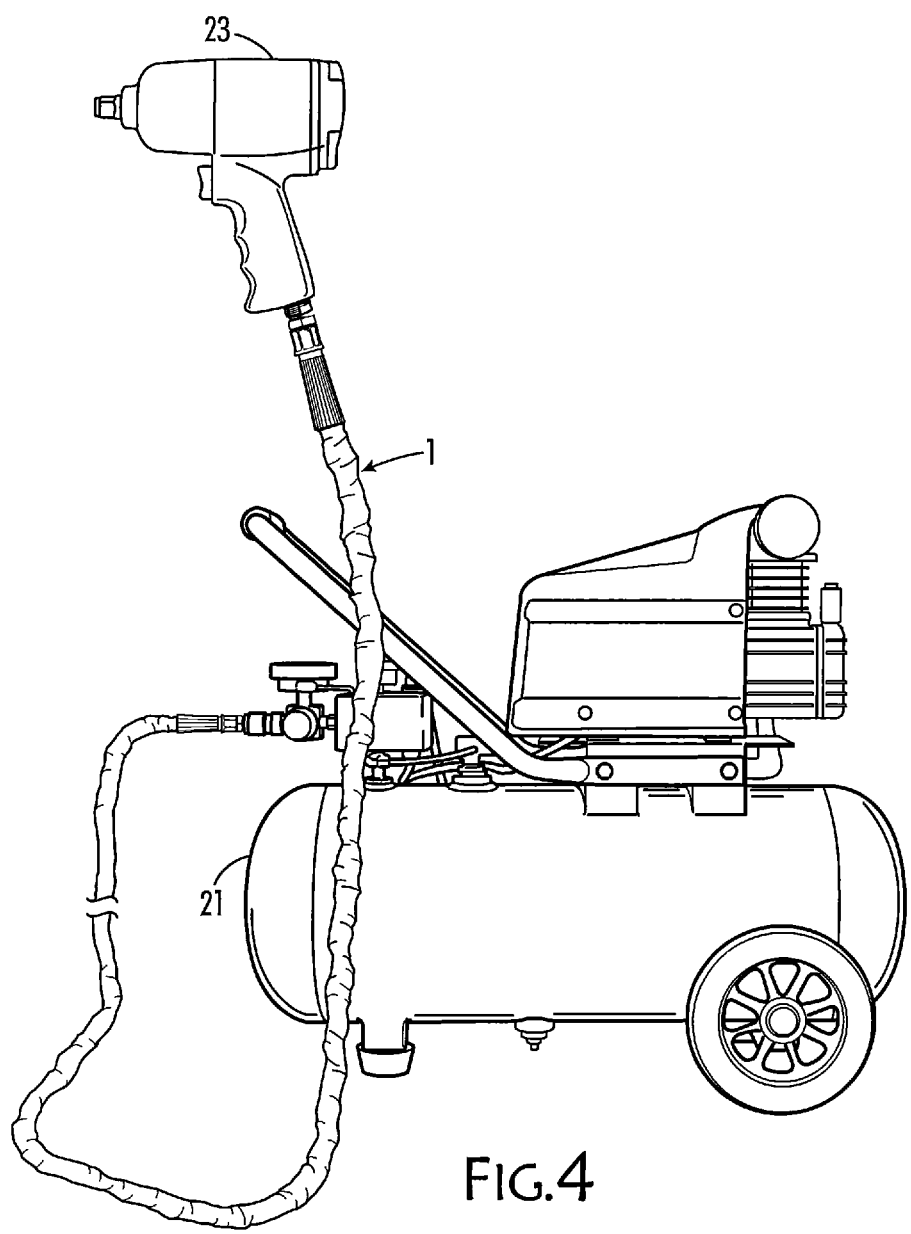
FIG. 4 is a plan view illustrating the pneumatic air hose in its operational mode.

FIG. 4 is a plan view of the expandable hose 1 connected to an air compressor 21 and to a pneumatic tool 23. When inflated and extended the expandable hose 1 has the extended length to facilitate use thereof. However, when the air compressor is disengaged the expandable hose has memory and returns to the original non-extended state.

Suitable materials of construction for the outer tubular inelastic sleeve are nylon or other inelastic materials. The inner elastic tubular member 3 is preferably formed from a thermoplastic elastomer or natural butyl rubbers. In test of the expandable hose it has been found that pressures up to 600 psi may be achieved without rupture of the elastic tubular member.

Having set forth a description of the expandable pneumatic hose, as well as the process of using same, such description is not meant to be used in a limiting sense but to be limited only by the spirit and scope of the following appended claims.

The invention claimed is:

1. A process for providing compressed air from a compressor to a work tool comprising steps of:

Providing an expandable air hose in a non-extended state;
Connecting an end portion of said expandable air hose to an air compressor;
Connecting the other end of said expandable air hose to a pneumatic tool;
Engaging said air compressor so as to force compressed air into said expandable air hose thus causing said expandable air hose to extend into an extended state, said compressed air engaging said pneumatic tool to cause motion therein;
Disengaging said air compressor from said expandable hose;
Permitting compressed air to escape from said expandable air hose;
Said expandable hose resuming its non-extended state.

2. The process according to claim 1 wherein said expandable air hose comprises an inner elastic tubular member and an outer inelastic sleeve with pneumatic fittings on either end thereof for connecting said elastic tubular member to said air compressor on one end thereof and a pneumatic tool on the other end thereof.

3. The process according to claim 1 wherein said extended state is approximately one and one-half to two times the length of said non-extended state.

4. The process according to claim 1 wherein said step of engaging comprises compressed air at a pressure of between 90 and 120 psi.

5. The process according to claim 2 wherein said elastic tubular member is formed from a thermoplastic elastomer and said inelastic sleeve is formed from nylon.

6. A process for providing compressed air from an air compressor to a work tool comprising steps of:

Providing an expandable air hose in a non-extended state having a first overall length;
Connecting an end portion of said expandable air hose to an air compressor;
Connecting the other end of said expandable air hose to a pneumatic tool;
Engaging said air compressor so as to force compressed air into said expandable air hose thus causing said expandable air hose to extend into an extended state having a length greater than the non-extended length, said compressed air engaging said pneumatic tool to cause motion therein;
Disengaging said air compressor from said expandable hose;
Permitting compressed air to escape from said expandable air hose;
Said expandable hose resuming its non-extended length;
Said extended length being approximately one and one-half to two times said non-extended length.

7. A process for providing compressed air from a compressor to a work tool comprising steps of:

Providing an extendable air hose in a non-extended state;
said extendable air hose comprising an inner elastic tubular member and an outer inelastic sleeve with pneumatic fittings on either end thereof for connecting said elastic tubular member to an air compressor on one end thereof and a pneumatic tool on the other end thereof;
Connecting an end portion of said extendable air hose to said air compressor;
Connecting the other end of said expandable air hose to said pneumatic tool;
Engaging said air compressor so as to force compressed air into said inner elastic tubular member thus causing said inner elastic tubular member to extend into said outer inelastic sleeve and forcing said extendable air hose into an extended state having a length of said outer sleeve, said compressed air engaging said pneumatic tool to cause motion therein;

Disengaging said air compressor from said inner elastic tubular member; and

Permitting compressed air to escape from said inner elastic tubular member causing said extendable hose to resume its non-extended state.

8. The process according to claim 1 wherein said extended state is approximately one and one-half to two times the length of said non-extended state.

9. The process according to claim 1 wherein said step of engaging comprises compressed air at a pressure of between 90 and 120 psi.

10. The process according to claim 1 wherein said elastic tubular member is formed from a thermoplastic elastomer and said inelastic sleeve is formed from nylon.

\* \* \* \* \*